United States Patent
Bruhn et al.

(10) Patent No.: US 6,198,185 B1
(45) Date of Patent: Mar. 6, 2001

(54) MAGNETIC RING

(75) Inventors: Rainer Bruhn, Ingersheim; Norbert Schuller, Neckarsulm, both of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/194,997

(22) PCT Filed: May 2, 1997

(86) PCT No.: PCT/EP97/02262
§ 371 Date: Jul. 9, 1999
§ 102(e) Date: Jul. 9, 1999

(87) PCT Pub. No.: WO97/46850
PCT Pub. Date: Dec. 11, 1997

(30) Foreign Application Priority Data

Jun. 5, 1996 (DE) .............................. 196 22 547
Jun. 26, 1996 (DE) .............................. 196 25 478

(51) Int. Cl.$^7$ .......................... H02K 11/00; H02K 15/00
(52) U.S. Cl. .............................. 310/68 B; 310/42
(58) Field of Search .................... 310/68 B, 42, 310/43, 66, 91, 156, 267, 268, DIG. 3; 335/302, 296

(56) References Cited

U.S. PATENT DOCUMENTS

| | | | |
|---|---|---|---|
| 2,432,819 | 12/1947 | Schumacker | 29/155.59 |
| 4,049,984 | * 9/1977 | Ishii et al. | 310/42 |
| 4,336,517 | * 6/1982 | Kobayashi et al. | 335/205 |
| 4,492,906 | * 1/1985 | Goto et al. | 318/488 |
| 4,710,659 | * 12/1987 | Takano et al. | 310/153 |

(List continued on next page.)

FOREIGN PATENT DOCUMENTS

| | | |
|---|---|---|
| 1 043 540 | 11/1958 | (DE) . |
| 76 28 220 U | 8/1978 | (DE) . |
| 86 14 601 U | 9/1986 | (DE) . |
| 37 18 047 | 12/1987 | (DE) . |
| 36 22 312 | 1/1988 | (DE) . |
| 36 36 039 | 4/1988 | (DE) . |
| 37 32 958 | 4/1989 | (DE) . |
| 92 16 750 U | 5/1994 | (DE) . |

(List continued on next page.)

OTHER PUBLICATIONS

Patent Abstracts of Japan, E–353, vol. 9, No. 270 (Oct. 26, 1985) (concerning 60–116110 by S. Kojima).
Patent Abstracts of Japan, E–417, vol. 10, No. 192 (Jul. 5, 1986) (concerning 61–35501 by Y. Hirabayashi).
Patent Abstracts of Japan, (Jul. 1987) (concerning 62–40706 by K. Tsunemi).
Patent Abstracts of Japan, P–685, vol. 12, No. 104 (Apr. 6, 1988) (concerning 62–237315 by T. Abe).
Patent Abstracts of Japan, P–758, vol. 12, No. 341 (Sep. 13, 1988) (concerning 63–101708 by T. Yokoyama).
Patent Abstracts of Japan, P–993, vol. 14, No. 31, (Jan. 22, 1990) (concerning 1–269013 by Y. Asami).
Patent Abstracts of Japan, (concerning 07037715 by M. Yoshihiko and K. Kotoji and published on Feb. 7, 1995).
International Search Report of Oct. 15, 1996.
International Search Report of Dec. 11, 1996.
Merriam Webster's Collegiate Dictionary, tenth edition, p. 376, 1997.*

*Primary Examiner*—Elvin Enad
*Assistant Examiner*—Dang Dinh Le
(74) *Attorney, Agent, or Firm*—J. Gordon Lewis

(57) ABSTRACT

A magnetic ring (1) is provided, comprising a magnetic disc (2) and an annular disc (10). The annular disc (10) is coated, by injection molding or die-casting, with a magnetizable material so that two spring tongues (20,21) protrude from the inner rim of the magnetic disc (2) which are able to exert a clamping effect on a shaft or rod (30).

14 Claims, 2 Drawing Sheets

U.S. PATENT DOCUMENTS

Figure 1:
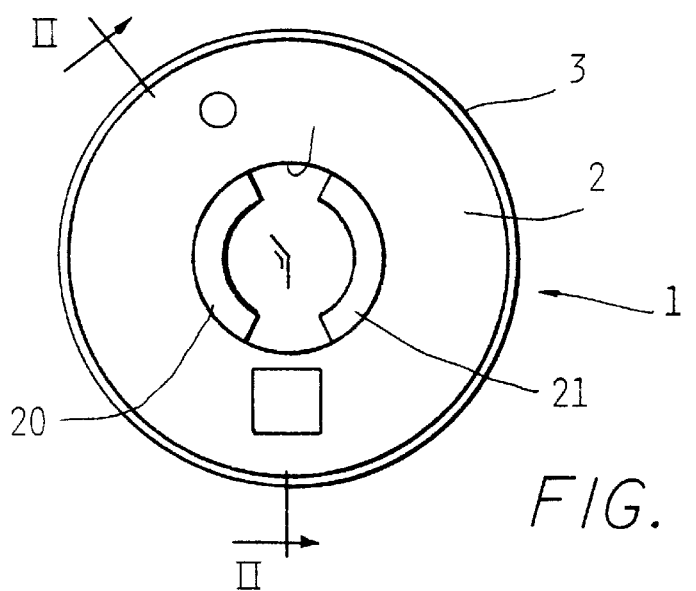

| | | | |
|---|---|---|---|
| 5,019,796 | 5/1991 | Lee et al. | 335/302 |
| 5,081,756 * | 1/1992 | Abe et al. | 29/593 |
| 5,293,125 * | 3/1994 | Griffen et al. | 324/173 |
| 5,563,463 * | 10/1996 | Stark | 310/156 |
| 5,565,721 * | 10/1996 | Knappe | 310/68 B |
| 5,608,277 * | 3/1997 | Emery et al. | 310/68 B |

FOREIGN PATENT DOCUMENTS

| | | |
|---|---|---|
| 0 213 732 | 3/1987 | (EP) . |
| 0 640 838 | 3/1995 | (EP) . |
| WO 85/04934 | 11/1985 | (WO) . |
| WO 97/46850 | 12/1997 | (WO) . |

* cited by examiner

MAGNETIC RING

The present invention is concerned with a magnetic ring intended to serve as a signal generator for a sensor sensitive to a magnetic field. Magnetic rings of this type, usually, are mounted, for example, on driving shafts of electromotors to determine the number of revolutions or the angular position thereof. For that purpose, the magnetic ring must be held on the shaft in a non-rotating manner. However, it cannot be directly forced onto the shaft because the magnetic material is brittle and would burst when forced onto the shaft. Consequently, the provision of additional fasteners is required.

It is suggested, for example, according to DE 37 32 958 C2 to use a fastener formed of a plastic sleeve of a T-shaped profile which carries the magnetic ring together with a back circuit sleeve on the cylindrical circumferential face extending in the axial direction, and on the front face thereof extending in the radial direction. To secure the said unit on the shaft, the plastic sleeve, the back circuit sleeve and the magnetic ring along with the shaft are coated, by spraying, with a plastic material.

It is readily apparent that this way of procedure is rather complex.

It is, therefore, suggested by the invention to spray the magnetic ring onto an annular disc, with the outer rim of the said annular disc being embraced by the magnet while at least certain sections of the interior thereof are exposed, with the exposed inner rim, at least in part, being located on a circle the diameter of which is only little less than the diameter of the shaft to which the magnetic ring is to be mounted.

The inwardly protruding sections of the annular disc form resilient holding elements capable of being forced onto the shaft, thereby holding the magnetic ring on the shaft in a non-rotating manner and locked against displacement, provided that the holding forces are selected correspondingly large, with the compression forces being applied to the annular disc rather than to the magnetic ring. Preferably, the inner rim of the disc, except for two recesses, is located on a circle, with the sections of the inner rim disposed in the recesses, being embraced by the magnet.

The recesses are in the form of segments the centers of which conform to the center of the circle formed by the remainder of the inner rim.

The embodiment so far described wherein the inwardly protruding sections of the annular disc comprise segment-shaped recesses, is intended for use at a place having a smooth surface. The recesses are required to enable the remaining bridges to bend in the axial direction.

However, the shaft can also be provided with some circumferentially distributed longitudinal grooves cut into the material, with the material extracted being piled up to form a longitudinal bridge along the groove. Now, if the annular disc is forced onto the said bridges, a firm foothold is formed; in addition, the provision of segmented recesses in the annular disc can be foregone.

The disc, preferably, is made of a non-magnetic metal, e.g. hard brass or a beryllium alloy.

A magnetic ring of the afore-described type is produced by spray-coating the premanufactured annular disc with a magnetizable material—as described—and by subsequently magnetizing the sprayed-on magnetic material in the desired way.

Figure 2:
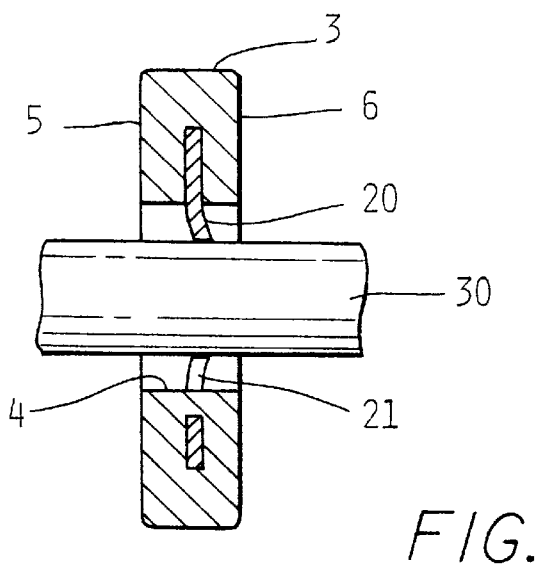
Figure 3:
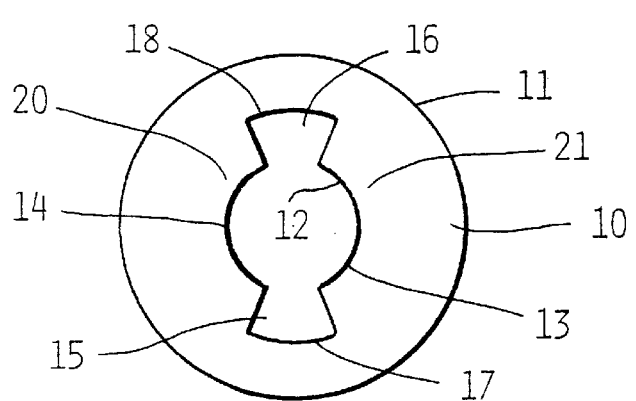
Figure 4:
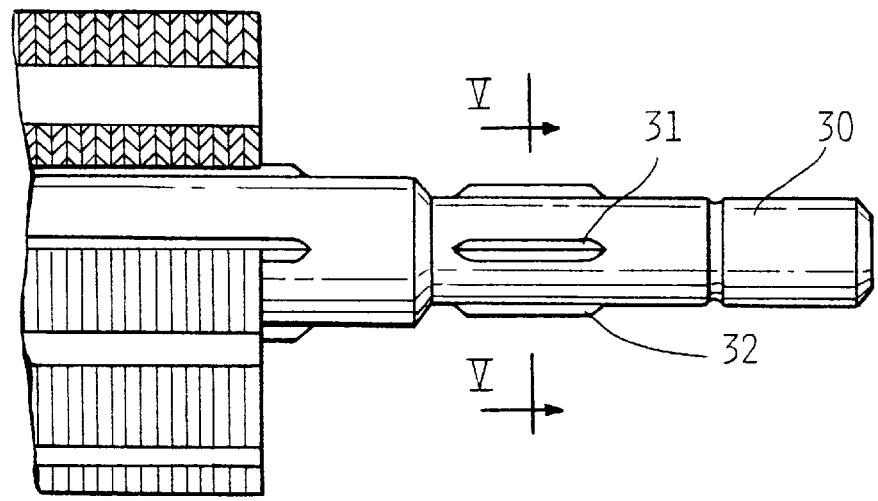
Figure 5:
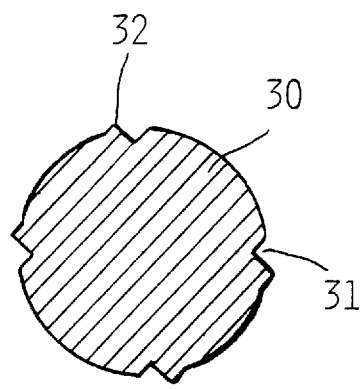
Figure 6:
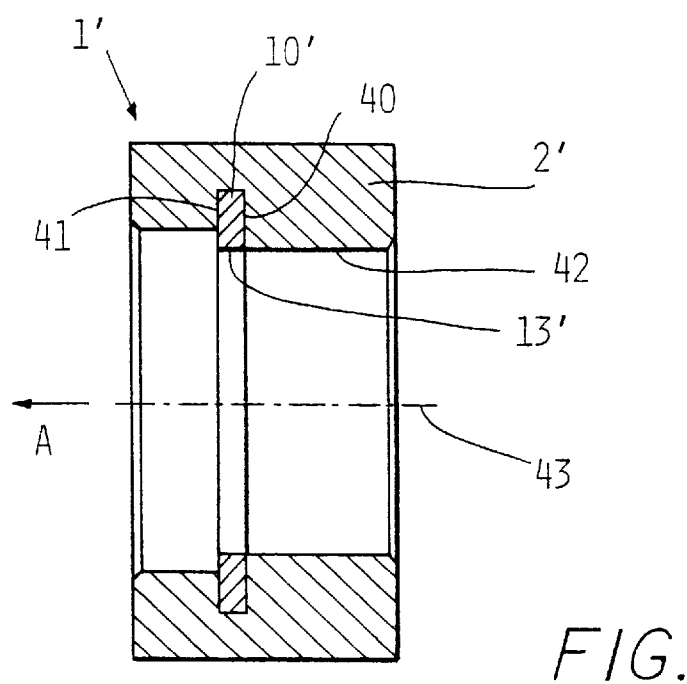

The invention will now be explained in closer detail with references to the drawings, wherein
FIG. 1 is a side view of a magnetic ring,
FIG. 2 is a sectional view taken along the line II—II of FIG. 1,
FIG. 3 is a plan view of the annular disc,
FIG. 4 shows a shaft provided with longitudinal grooves,
FIG. 5 is a sectional view taken along the line V—V, and
FIG. 6 is a sectional view of another form of embodiment shown in FIG. 1.

Now, referring to the drawings, the magnetic ring is generally designated by reference numeral 1. It comprises a magnetic disc 2 of magnetic or magnetizable material the outer rim 3 and the inner rim 4 of which respectively form cylinder jacket faces. The side faces 5 and 6 are of a flat configuration.

The annular disc 10 is made of a non-magnetic metal, such as hard brass; the thickness thereof is clearly less than the strength of the magnetic ring 2. The outer rim 11 thereof is located on a circle smaller in diameter than the diameter of the outer rim of the magnetic ring 2. The inner rim 12 is located on two opposite angular sections 13,14 on a circle of an inside diameter smaller than the inside diameter of the magnetic ring 2.

The inner rim 12 comprises two outwardly drawn recesses 15,16 that are arranged opposite one another and are of a segmented configuration, with the center of the segments conforming to the center of the annular disc 10. The inner rim 17,18 of the recesses 15,16 is located on a circle the diameter of which exceeds the inside diameter of the magnetic ring 2.

The holding disc 10 according to FIG. 3 is coated, by injection molding or die-casting, with a magnetizable material, with the corresponding magnetic ring being in concentric relationship to the holding disc 10, thereby forming a structure as shown in FIG. 1 or FIG. 2, with two metallic tongues 20,21 protruding from the inner rim of the magnetic disc 2 and acting as clamping elements.

After the magnetic material having been sprayed about the holding disc 10, it is magnetized. Now, the so formed magnetic ring can be pushed onto a shaft or rod 30 (see FIG. 2). The clamping forces are taken up by the holding disc and are not directly introduced into the magnetic disc 2 thereby preventing the magnetic material from bursting. By a corresponding selection of the inside diameter of the inner wheel 13,14 of the holding disc 10, adequate clamping forces can be generated to hold the magnetic ring 2 in a non-rotating way on shaft 30.

FIG. 4 shows a shaft 30 onto which the magnetic ring can be pushed. To secure a safe foothold, shaft 30 is provided with longitudinal slots 31 to which the longitudinal bridges (32) extend in parallel.

The left-hand slots are grooved; during grooving, the material contained within the slot is forced outwardly and pressed toward bridge 32.

FIG. 5 shows a cross-sectional view of the shaft 30. It can be seen that the sharp-edged bridges protrude from the jacket face of the shaft.

This method will also be employed, among others, to fasten the sheet package of the rotor on the shaft. The magnetic ring is pushed onto the so prepared shaft; in that case, it is not necessary for the annular disc to be provided with a recess. It will be adequate for it to have a continuous inner rim which is located on a circle.

FIG. 6 relates to a form of embodiment having a continuous inner rim and being especially easy to mount. Reference numerals identical with those used in the other depicts are additionally marked by the character'. As shown in the depict, a cylindrical annular disc 10', on one disc side 40, is coated, by injection molding or die-casting, with a magnetic material down to the cylindrical inner rim 13'. On the other side 41 of the disc, the inner rim 13' is completely exposed. Hence, the material on side 41 of the disc is staggered back over the inner rim 13' quasi in a step-type form, whereas, on the other disc side 40, it extends directly to the inner rim. In that area, the cylindrical inner jacket face 42 of the magnetic disc 2' forms a support face when pushing the magnet ring onto the driving shaft of the electromotor, thereby avoiding the danger of canting or clamping during the pushing process. In this connection it is understood that the magnetic ring 1' is pushed on a shaft end in the direction of arrow A. In that form of embodiment, the properties of the annular disc 10' and of the magnetic disc are complementary to one another because the annular disc 10' with the inner rim 13' thereof is in direct abutment with the driving shaft, thereby preventing damage to the magnetic material through deformation. Conversely, the magnetic material insures, by the inner jacket face 42, a reliable guidance of the magnetic ring during the pushing process. As the magnetic ring 1' is in rotational symmetry with the axis 43, it is easy to manufacture. No position indexing of the magnet ring 1' in the circumferential direction, based on axis 43 and the driving shaft, respectively, is required for the assembly.

What is claimed is:

1. A magnetic ring mountable on a shaft or rod including an annular element clamped, in a non-rotating way, on a circumference of the shaft or rod and fixed vis-a-vis a magnetic disc, characterized in that the annular element is an annular ring disc with an outer rim embedded within a magnetic disc and an inner rim, at least in part, exposed externally of the magnetic disc, with the inner rim, at least in part, being located on a circle with a diameter only little less than a diameter of the rod or shaft.

2. The magnetic ring according to claim 1, characterized in that the inner rim of the annular disc, except for two recesses, forms a circle, with sections of the inner rim disposed within the recesses being embedded within the magnetic disc.

3. The magnetic ring according to claim 2, characterized in that the recesses form segments based on the center of the annular disc.

4. The magnetic ring according to claim 1, characterized in that the annular disc is made of a non-magnetic material.

5. The magnetic ring according to claim 4, characterized in that the holding disc is made of hard brass or a beryllium alloy.

6. The magnetic ring according to claim 1, characterized in that the inner rim of the annular disc is disposed on a circle, and that the shaft onto which the magnetic ring is forced, is provided with longitudinal bridges forced out of the material of the shaft.

7. The magnetic ring according to claim 6, characterized in that the magnetic disc on one disc side directly extends down to the inner rim and, on the other disc side, vis-a-vis the inner rim is staggered back step-wise.

8. In a magnetic ring mountable on a shaft, including an annular element clamped, in a non-rotating way, on the circumference of the shaft and fixed vis-a-vis a magnetic disc, the improvement comprising:

the annular element defined by an annular ring disc having an outer rim embedded within a magnetic disc and an inner rim, at least in part, exposed externally of the magnetic disc, with the inner rim, at least in part, being located on a circle with a diameter only little less than a diameter of a shaft to be received therein.

9. The magnetic ring of claim 8, comprising the inner rim of the annular disc, except for two recesses, forming a circle, with sections of the inner rim disposed within the recesses being embedded within the magnetic disc.

10. The magnetic ring of claim 9, comprising the recesses forming segments based on the center of the annular disc.

11. The magnetic ring of claim 8, comprising the annular disc made of a non-magnetic material.

12. The magnetic ring of claim 11, comprising the annular disc made of a material selected from a group including hard brass and a beryllium alloy.

13. The magnetic ring of claim 8, comprising the inner rim of the annular disc disposed on a circle, and the shaft onto which the magnetic ring is forced, provided with longitudinal bridges forced out of a material of the shaft.

14. The magnetic ring of claim 13, comprising the magnetic disc on one disc side directly extending down to the inner rim and, on the other disc side, vis-a-vis the inner rim staggered back step-wise.

* * * * *